United States Patent Office 3,102,225
Patented Aug. 27, 1963

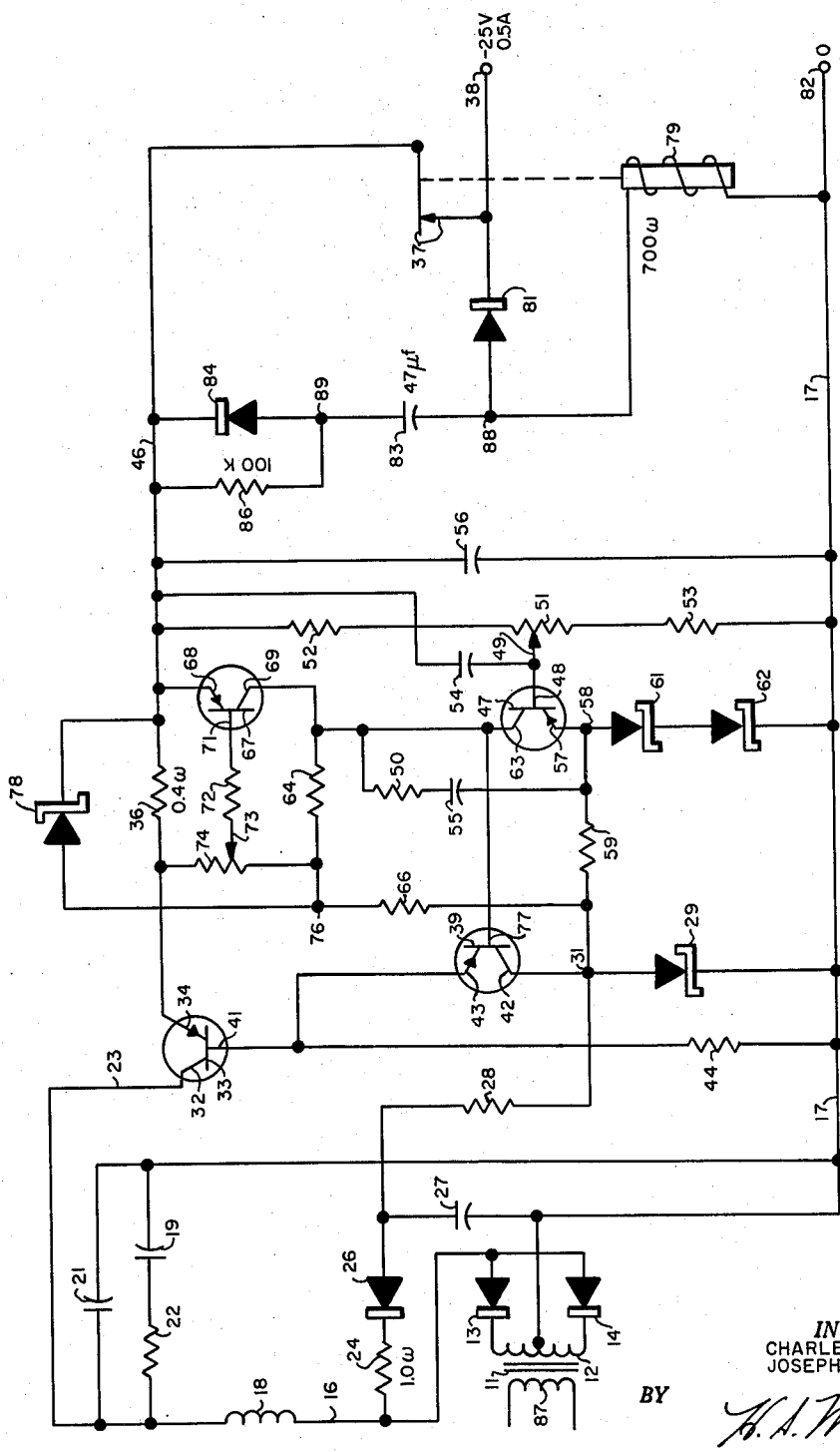

3,102,225
TRANSISTOR POWER SUPPLY CIRCUIT
Charles R. Kenny, Purdys Station, and Joseph Reed, New Rochelle, N.Y., assignors to General Precision, Inc., a corporation of Delaware
Filed Oct. 3, 1960, Ser. No. 59,997
2 Claims. (Cl. 323—22)

This invention relates to regulated power supplies and more particularly to such supplies containing a series transistor as the regulating element.

Power supplies using transistors are difficult to protect from overload destruction because of the small heat capacity of a transistor combined with a large heat coefficient. A transistor cannot be protected by a fuse for this reason. Consequently, a voltage-regulated power supply containing a series transistor as the regulating element is subject to burnout on a small excess of load current, even though the excess current is maintained for a short time measured in microseconds. This has been a problem in some circuits in which transistors replace vacuum tubes.

The present invention overcomes this problem in regulated power supplies by providing two cooperating devices, neither one of which alone can provide satisfactory protection. In the event of an overload the first device, a current limiter built into the voltage regulator, limits the current through the series regulating transistor to such value as to prevent burnout in microseconds. The second device is an electromagnetic undervoltage cutout which disconnects the load. The time of action of this device is measured in milliseconds and is short enough to remove the load from the series transistor before it is damaged.

It is necessary to employ both components because the relay, alone, is not fast enough and because the current limiter, if made to limit the current to that of the maximum continuous high temperature rating of the transistor, would severely impair voltage regulation at normal and low temperatures. Thus in the present state of the transistor art it is necessary to combine these two modes of operation for adequate protection.

One purpose of this invention is to provide a transistor voltage-regulated low-voltage power supply which is not destroyed by overloading.

Another purpose is to provide a power supply having a series transistor regulating element containing a current limit circuit and an undervoltage cutout.

Still another purpose of this invention is, in a regulated transistor low-voltage power supply, to provide a voltage regulating circuit which instantly reverses its function and limits the power supply current at a selected current maximum, and an automatic circuit for disconnecting an overload within a period of time after current limiting which depends on both the severity and duration of the overload.

A further understanding of this invention may be secured from the following description taken together with the attached drawing, the single FIGURE of which is a schematic diagram of the circuit of the invention.

Referring now to the drawing, a power transformer 11 operating from alternating power mains is provided with a centertapped secondary winding 12. Two diodes 13 and 14 provide full wave rectification to generate direct current of negative potential at conductor 16, with the return at conductor 17. A series inductor 18, capacitors 19 and 21, and resistor 22 provide filtering with a selected bandwidth. The output at conductor 23 under average loading is about −30 volts.

A second, independent, direct-current power supply is secured by connecting conductor 16 through a one-ohm protective resistor 24 and a diode 26 to a filter consisting of a capacitor 27 and a resistor 28. The diode 26 is used to isolate the higher potential of this capacitor-input supply from the lower potential of the other supply. The resistor 28 is connected to a 33-volt Zener diode 29 which maintains the output voltage of this supply at junction 31 at −33 volts.

The filter output conductor 23 is connected to the collector 32 of a transistor 33 which constitutes the adjustable, series resistance regulating element of the power supply circuit. Its emitter 34 is connected through a 0.4 ohm metering resistor 36 and relay contacts 37 to the power supply negative output terminal 38.

A transistor 39 is connected as an emitter follower to control the base of transistor 33. The collector 42 is connected to the voltage source terminal 31 and the emitter 43 is connected through a load resistor 44 to the return bus 17.

The potential between the power supply output buses 46 and 17 is sensed by a transistor 47 having its base 48 connected to the slider 49 of a potentiometer 51. This potentiometer is connected through resistors 52 and 53 to the buses 46 and 17. Capacitors 54 and 56 help to control the filter bandwidth. The circuit including resistor 50 and capacitor 55 in series prevents oscillation of the regulator within the filter bandwidth by moving the resonant frequency out of the bandwidth. The emitter 57 of transistor 47 is connected to the −10 volt point 58 of a potentiometer consisting of resistor 59 and diodes 61 and 62 connected in series between junction 31 and the common bus 17. The diodes 61 and 62 are Zener diodes having a combined rating of 10 volts. The collector 63 of transistor 47 is connected to the −33 volt supply junction 31 through resistors 64 and 66.

A current limiting transistor 67 has its emitter 68 connected to the bus 46 and its collector 69 connected to the collector 63 of the transistor 47. The base 71 is connected through a protective resistor 72 to the slider 73 of a potentiometer 74 connected between the emitter 34 of the transistor 33 and the junction 76 of resistors 64 and 66.

The base 77 of transistor 39 is connected directly to the collectors 63 and 69 of transistors 47 and 67. The junction 76 is connected through a 10-volt Zener diode 78 to the bus 46.

A relay coil 79 having a resistance of 700 ohms is shunted in series with a diode 81 across the output terminals 38 and 82. The relay contacts 37 are connected between the output terminal 38 and bus 46. A large capacitor 83 in series with a diode 84 is connected from the junction 88 of the winding 79 and diode 81 to the bus 46. The diode 84 is shunted by a 100,000-ohm resistance 86. When the relay coil 79 is deenergized the contacts 37 are open and both the load and the relay coil are disconnected from the −25 volt bus 46. When the relay coil 79 is energized the contacts 37 are closed, as shown in the drawing, and the load and coil are both connected between buses 46 and 17.

In the operation of this power supply, when power is applied to the primary winding 87 of transformer 11 the rectifying diodes apply a steeply-increasing negative potential to the bus 46. This generates a pulse of current which passes through diode 84 and is coupled by capacitor 83 to the relay coil 79, which operates, closing contacts 37 and locking itself closed by connection of the coil terminal 88 through diode 81 and contacts 37 to the bus 46.

The function of the diode 81 is, during this initial relay-operating pulse, to prevent any low resistance load path that may be present across terminals 38/82 from short circuiting the relay coil 79. The initial pulse coupled by the capacitor 83, being negative, cannot pass through the diode 81 to the load.

Regulation of the voltage of the bus 46 within the normal current range of the power supply is effected by the sensing transistor 47, the emitter follower 39 and the series transistor 33 serving as an adjustable resistance. The transistor 67 is not operative during this normal range regulation because it has substantially infinite emitter-collector resistance. The manually adjustable potentiometer 74 is provided to bias the transistor 67 so that it remains nonconductive through the normal range and also to adjust the current point above the normal current range at which the operation of this current-limiting transistor commences. The function of the potentiometer 51 is to provide for manual adjustment of the power supply output voltage.

In normal regulation, if the load resistance decreases, its current increases and the voltage of bus 46 tends to decrease. This decreases the negative potential of base 48, decreasing the current drawn by collector 63 through resistors 64 and 66. This decreases the voltage drop through resistors 64 and 66, increasing the negative potential of base 77 of transistor 39. The emitter 43 potential follows this increase of negative base potential, increasing the negative potential of base 41 of transistor 33. This reduces the internal resistance of transistor 33, thus increasing current flow to the load and restoring the voltage level in bus 46.

The function of the diode 78 is to remove the transistor 47 from operation when a heavy load or short circuit occurs at the power supply output terminals. When this occurs the bus 46 goes toward or to zero volts and, since there is then a potential of more than 10 volts between the —33 volt junction 31, through resistor 66 and diode 78 to the bus 46, the diode 78 becomes conductive in its reverse direction with a 10 volt drop. This places a minus ten volt potential on the collector 63 and, since there is already minus ten volts on the emitter 57 as maintained by the Zener diodes 61 and 62, this action renders transistor 47 nonconductive.

Upon increase of the current furnished by the power supply beyond a certain point the current limiting transistor 67 comes into operation. As an example, if the normal current range has a maximum of ½ ampere and the slider 73 is set to limit the current to 120% of the rated maximum current, the transistor 67 begins to draw current when the load current approaches 0.6 ampere. The transistor draws current because the increased load current through resistor 36 causes increased voltage drop therein, increasing the negative potential at the slider 73 and consequently at the base 71 relative to the emitter 68. This change of base potential causes current flow through the emitter and collector of the transistor 67. This current is drawn from the junction 31 through resistors 66 and 64, and their increased voltage drop causes a decrease of negative potential at the collector 69 and consequently at the connected base 77 of transistor 39. The effect produced by reducing the potential of base 77 is opposite to that simultaneously exerted by transistor 47 of increasing the potential of base 77. However, the biases and rates of action are so arranged that at a load current approaching 0.6 ampere the action of transistor 67 overtakes or more than neutralizes and counteracts the action of transistor 47, so that, the emitter 43 following the base 77, the negative potential applied to the base 41 of transistor 33 tends to be reduced and the progressive reduction of resistance of this transistor by the normal regulating action is halted at such a value that the maximum current that will be drawn through this transistor by a short circuit at the supply output terminals is restricted to 0.6 ampere.

The transistor 33 is of a type which will withstand a current of 0.6 ampere at room temperature, but which is heated by such a current so much that in a matter of milliseconds its temperature increases enough to destroy it. In fact, typically, the current which it can safely carry at 71° C. is only 0.3 ampere. Therefore, the current limiting protection is sufficient for transient loads and even for short circuits lasting no longer, say, than 50 ms., but this protection is insufficient for heavy loads of longer duration. The electromagnetic relay 79 is therefore provided to operate, in conjunction with the current limiting protection, to disconnect a heavy load, or a short circuit persisting for more than 50 ms., or a series of rapidly repeated short circuits, each shorter than 50 ms.

The operation of this relay on a low resistance overload or on short circuit is as follows. Let it be supposed that before short circuit the bus 46 is at —25 volts. The terminals 88 and 89 of capacitor 83 are also at —25 volts. When the output terminals 38 and 82 are shorted, the current through coil 79 falls to nearly zero and the voltage across the coil also becomes very low. Thus the capacitor terminal 88 falls to nearly zero potential. The bus 46, being connected to terminal 38, also falls to nearly zero potential. Terminal 89 of the capacitor follows the other terminal 88 to the same low voltage. The coil 79 releases its armature and the contacts 37 open. Bus 46 and terminal 89 regain the full potential of —25 volts and the other capacitor plate connected to terminal 88 follows to —25 volts. However, now the voltage on terminal 88 commences to drain to bus 17 through coil 79, so that voltages of the two plates of the capacitor 83 begin to separate. That is, the capacitor assumes a slight charge. Meanwhile, the sudden return of potential to bus 46 generates a pulse which, through capacitor 83, again operates coil 79, closing contacts 37.

The entire action is again repeated, but with an addition to the charge on capacitor 83. After several such cycles this capacitor has accumulated such charge that its terminal 89 remains near —25 volts while its terminal 88 remains near zero. In this situation, when the contacts 37 open, the pulse transmitted through the coil 79 is too weak to operate it and the relay contacts remain open.

These contacts now remain open whether the output terminals remain short circuited or not. Capacitor terminal 89 is at the bus 46 potential of —25 volts and capacitor terminal 88 is at the bus 17 potential of zero.

The time required to vibrate the contacts 37 through the required several cycles, then to lock them open as described, is several milliseconds, a time short enough to protect the series transistor 33 because it has been current limited by the circuit of transistor 67, but long enough to avoid opening the load circuit when the short circuit is only transistory. Moreover, the time required for lockout depends not only on the duration of the overload but also on its severity, which is exactly the characteristic desired for most effective protection. Needless interruptions due to transitory, harmless short circuits are avoided while complete protection is provided against overloads of harmful magnitude and short circuits of harmful duration.

In order to restore the power supply to service, the transformer primary winding 87 is merely removed from the power supply for about five seconds. The negative charge on terminal 89 of capacitor 83 leaks off during this time substantially completely through the high resistance 86 and resistors 52, 51 and 53. When the transformer is now reconnected to the power supply the pulse through capacitor 83 operates the relay 79, closing its contacts 37, locking the relay closed and restoring the power supply to its operating condition.

What is claimed is:

1. A regulated power supply comprising, supply means generating a direct current and having two terminals, a load having two terminals, one terminal of said load being directly connected to one terminal of said supply means, a series control transistor having an emitter-collector path connected at one end to the other terminal of said supply means, said series control transistor having a base terminal, a current-sensing resistor having one terminal connected to the other end of said emitter-collector path and having a second terminal, a transistor having its base connected to sense the potential of said second terminal relative to one terminal of the supply means and having a collector terminal, emitter-follower transistor means connecting said collector terminal to said series control transistor base for increasing the resistance of said emitter-collector path in proportion to said potential, a current-limiting transistor having its emitter and base connected across said current-sensing resistor to sense the potential drop thereacross and thereby to sense said emitter-collector path current, said current limiting transistor having its collector connected to said collector terminal whereby connection is made through said emitter follower transistor means to said series control transistor base for increasing the resistance of said emitter-collector path in proportion to said emitter-collector path current above a selected current value, an electromagnetic relay having a coil and normally open contacts, said relay coil being connected through a capacitor to said second terminal and directly to said one load terminal, said relay contacts being connected in shunt with said capacitor, said coil being operated by current proportional to increase of potential across said capacitor and locked closed by its own contacts, said relay releasing at a selected undervoltage, and a connection from the other terminal of said load to the junction of said coil and capacitor.

2. A regulated power supply comprising, supply means generating a direct current and having two terminals, a load having two terminals, one terminal of said load being directly connected to one terminal of said supply means, a series control transistor having an emitter-collector path connected at one end to the other terminal of said supply means, said series control transistor having a base terminal, a current-sensing resistor having one terminal connected to the other end of said emitter-collector path and having a second terminal, a transistor having its base connected to sense the potential of said second terminal relative to said one terminal of the supply means and having a collector terminal, emitter follower transistor means connecting said collector terminal to said series control transistor base for increasing the resistance of said emitter-collector path in proportion to said potential, a current-limiting transistor having its emitter and base connected across said current-sensing resistor to sense the potential drop thereacross and thereby to sense said emitter-collector path current, said current-limiting transistor having its collector connected to said collector terminal whereby connection is made through said emitter follower transistor means to said series control transistor base for increasing the resistance of said emitter-collector path in proportion to said emitter-collector path current above a selected current value, an electromagnetic relay having a coil and normally open contacts, said coil being connected to a capacitor and to said one terminal of the load, the other end of said capacitor being connected through a unilaterally conductive diode to said second terminal, a high resistance resistor shunting said diode, said contacts being connected to said second terminal and to a rectifying diode, the other terminal of said rectifying diode being connected to the junction of said coil and said capacitor, and a connection from the other terminal of said load to the junction between said contacts and said rectifying diode.

References Cited in the file of this patent
UNITED STATES PATENTS

| 2,904,742 | Chase | Sept. 15, 1959 |
| 2,925,535 | Titze | Feb. 16, 1960 |
| 2,925,548 | Scherer | Feb. 16, 1960 |
| 3,058,036 | Ruether et al. | Oct. 9, 1962 |